United States Patent [19]

Treise

[11] 4,447,814
[45] May 8, 1984

[54] DIGITAL VOR BEARING MEASUREMENT APPARATUS

[75] Inventor: Jan E. Treise, West Melbourne, Fla.

[73] Assignee: Rockwell International Corporation, El Segundo, Calif.

[21] Appl. No.: 472,682

[22] Filed: Mar. 7, 1983

[51] Int. Cl.³ ............................................. G01S 1/44
[52] U.S. Cl. ................................... 343/401; 364/451
[58] Field of Search ............... 343/399, 400, 401, 404; 364/451

[56] References Cited

U.S. PATENT DOCUMENTS 4,074,267 2/1978 Knox ................................... 343/401

Primary Examiner—Theodore M. Blum
Attorney, Agent, or Firm—Bruce C. Lutz; Robert C. Mayes; H. Fredrick Hamann

[57] ABSTRACT

A VOR bearing measurement scheme wherein the received 30 hertz reference signal is delayed a fixed time to produce an approximately 90 degree phase shifted reference signal. The reference is multiplied by the phase shifted, itself and the variable signals to produce first, second and fourth signals. The variable signal is then multiplied by the phase shifted signal to produce the third signal. The bearing is then indicative of the ratio of filtered third and fourth signals less the ratio of filtered first and second signals.

5 Claims, 3 Drawing Figures

DIGITAL VOR BEARING MEASUREMENT APPARATUS

THE INVENTION

The present invention is generally related to electronics and more specifically related to apparatus for ascertaining VOR (Very high frequency OMNI Range) bearing measurements.

VOR ground stations transmit a composite signal which provides an indication of bearing from the station as the phase difference between two 30 hertz signals. One of these signals, the variable phase, is amplitude modulated on the carrier while the other, the reference phase, is transmitted as frequency modulation on a 9,960 hertz subcarrier which is amplitude modulated on the carrier. In the VOR receiver, the two signals are recovered and processed to ascertain the phase difference between them. In one embodiment of this invention, this processing is provided by a digital circuit which samples the two signals periodically. The phase difference in this embodiment is determined by using in phase and quadrature phase reference signals. An exact 90 degree phase shift is difficult to achieve for other than a predetermined set of conditions. The present invention uses a delay line to generate the quadrature signal. This delay line has a 90 degree phase shift at only one frequency and thus output signal errors are produced when the signal frequency is not exactly 30 hertz. The present invention provides a correct output by measuring the phase shift of the delay line to provide a correction factor which is used to eliminate errors caused by signals having frequencies other than the 30 hertz standard.

Although there are many approaches to obtaining VOR bearing measurement, there is continual striving to provide higher accuracy and/or lower cost than the prior art. This inventive concept is believed to provide the best bearing measurement for the price and size available to date.

It is therefore an object of the present invention to provide an improved VOR bearing measurement device.

Other advantages and objects of the present invention may be ascertained from a reading of the specification and appended claims in conjunction with the drawings wherein:

DETAILED DESCRIPTION

Figure 1:
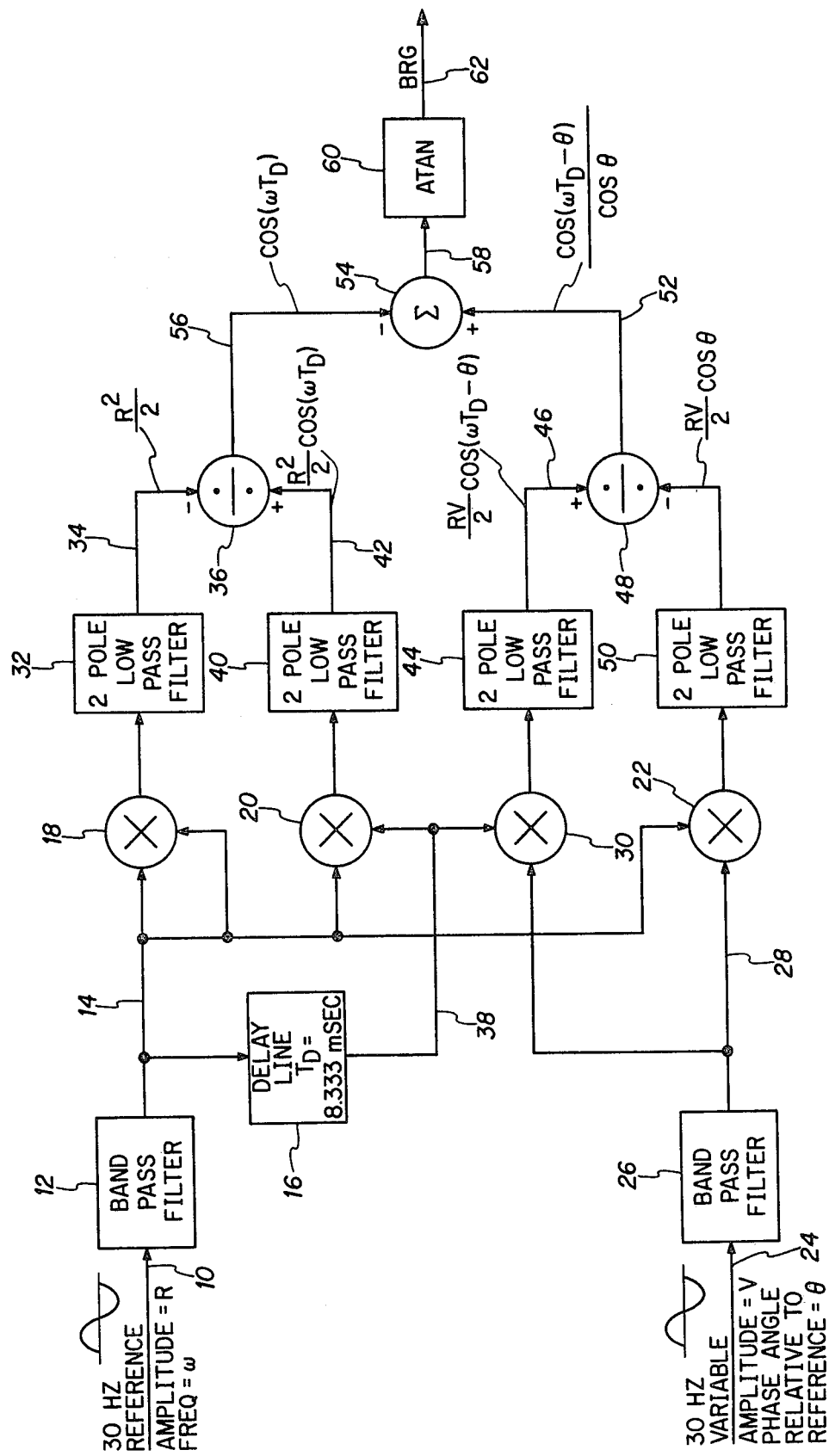
FIG. 1 is a block diagram of one embodiment of the invention.

In FIG. 1 a 30 hertz reference signal whose amplitude is R and frequency is Omega is supplied on a lead 10 to a bandpass filter 12 which has an output supplied on lead 14. Signals on lead 14 are input to a delay line block 16, a multiplying circuit 18, a multiplying circuit 20 and a multiplying circuit 22. A 30 hertz signal, whose phase is variable with respect to the reference signal, is supplied on a lead 24 and has an amplitude V, and a phase angle relative to the reference of $\theta$. This signal on lead 24 is supplied to a bandpass filter 26 which provides outputs on a lead 28 to the multiplying circuit 22 as well as to a multiplying circuit 30. The multiplying circuit 18 receives two inputs from lead 14 and thus multiplies the signal times itself thereby providing a squared output signal to a two pole low-pass filter 32 which removes the alternating components and passes only the direct voltage component ($R^2/2$) on a lead 34 to a dividing circuit 36. The delay line block 16 provides output signals on a lead 38 to the multiplying circuits 20 and 30. The multiplying circuit 20 outputs signals through a two pole low-pass filter 40 to remove the AC components and supply on a lead 42 the signal shown to the dividing circuit 36. The multiplying circuit 30 provides output signals through a two pole low-pass filter 44 which again removes the alternating components and provides an output of $(RV/2) \cos(\omega T_D - \theta)$ on a lead 46 to a dividing circuit 48. The multiplying circuit 22 provides output signals through a final two pole low-pass filter 50 which removes the alternating components and supplies the signal $(RV/2) \cos \theta$ to a second input of dividing circuit 48. The quotient of the dividing operation in divider 48 is supplied on a lead 52 to a summation circuit 54. The quotient of the dividing operation performed in divider 36 is $\cos(\omega T_D)$ and is supplied on a lead 56 to a second input of summation circuit 54. The result of the summation in 54 is supplied on a lead 58 to an arctangent circuit 60 which operates on the input to provide an output which is indicative of the angle whose tangent was equal to the signal on lead 58. This output is the bearing signal and is supplied on a lead 62.

Figure 2:
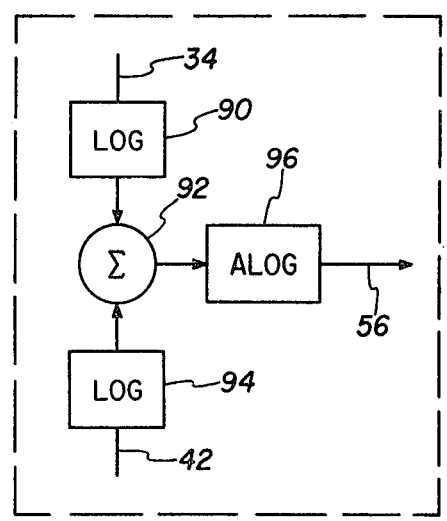
FIG. 2 is an analog representation of a portion of FIG. 1.

In FIG. 2 a representation is shown of either of the dividing circuits 36 or 48 of FIG. 1. In other words, the lead 34 shown in FIG. 2 may be the same as that obtained from the two pole low-pass filter 32. By taking the log of this signal in block 90 and supplying it to a summation circuit 92 and taking a signal such as 42 and passing it through a log block 94 before inputting it to summation circuit 92, a division will be effectuated. If this result is then passed through an antilog circuit such as 96 before being output on lead 56, the result will again be returned to an analog signal indicative of the division of the signals supplied on leads 34 and 42. This same approach can be used with respect to divider 48 to accomplish the division in analog terms. In the digital world, multipliers and dividers and summation circuits are readily available as commercial off the shelf items.

Figure 3:
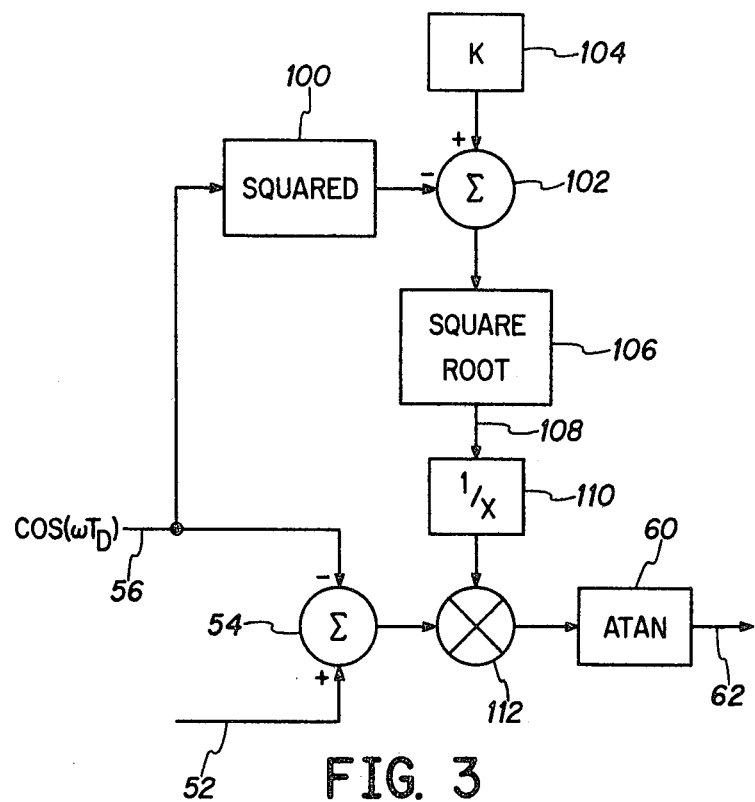
FIG. 3 is an alternate approach modification to FIG. 1 for slightly improving the accuracy of the basic inventive concept presented herein.

FIG. 3 illustrates the circuitry necessary to add to the FIG. 1 presentation to obtain even further accuracy. Where the items are the same as in FIG. 1, the same numbers have been utilized. As shown, a squaring circuit 100 is shown receiving signals from lead 56 to square the $\cos(\omega T_D)$ signal and supply it to a summation circuit 102 which receives a constant input (K) from a block 104. The output of summation circuit 102 is supplied to a square root circuit 106 which provides an output on a lead 108 that is inverted in inverting block 110 before being supplied to a multiplying circuit 112. This, therefore, effectively divides the square root result into the signal output by summation circuit 54 and provides the product to the arctangent circuit 60.

OPERATION

In describing the operation of the present invention, the following signal definitions will be used:
Reference Signal (REF): $R \sin(\omega t)$
Variable Signal (VAR): $V \sin(\omega t - \theta)$
Delay Line Output (DELAY OUTPUT): $R \sin(\omega(t - T_D))$ where $T_D$ is the length of the delay line If the reference signal is multiplied times the variable signal the following Equation (1) will be obtained.

$$REF*VAR = RV \sin(\omega t) \sin(\omega t - \theta) \quad (1)$$

By using the miscellaneous relations of trigonometric formula, Equation (2) can be obtained from Equation (1).

$$REF*VAR = (RV/2)\cos\theta - \cos(2\omega t - \theta)) \quad (2)$$

The second portion of Equation (2) is actually an alternating component while the lefthand portion is a DC component. Thus, after filtering Equation (3) may be obtained.

$$REF*VAR = (RV/2)\cos\theta \quad (3)$$

If the delay line output is multiplied times the variable signal, Equation (4) may be obtained.

$$DELAY\ OUTPUT*VAR = RV \sin(\omega t - \theta) \sin(\omega(t - T_D)) \quad (4)$$

Again, using trigonometric conversions, Equation (5) can be obtained from manipulation of Equation (4).

$$DELAY\ OUTPUT*VAR = (RV/2)(\cos(\omega T_D - \theta) - \cos(2\omega t - \theta - \omega T_D)) \quad (5)$$

Like before, the righthand portion of Equation (5) is an alternating component and the lefthand side is a direct voltage component. Thus, after filtering Equation (6) is obtained.

$$DELAY\ OUTPUT*VAR = (RV/2)\cos(\omega T_D - \theta) \quad (6)$$

If Equation (6) is divided by Equation (3), and then manipulated according to trigonometric equations, Equations (7), (8), (9) and (10) are obtained as shown below.

$$\frac{DELAY\ OUTPUT*VAR}{REF*VAR} = \frac{\frac{RV}{2}\cos(\omega T_D - \theta)}{\frac{RV}{2}\cos\theta} \quad (7)$$

$$\frac{DELAY\ OUTPUT*VAR}{REF*VAR} = \quad (8)$$

$$\frac{\frac{RV}{2}(\cos\omega T_D \cos\theta + \sin\omega T_D \sin\theta)}{\frac{RV}{2}\cos\theta}$$

$$\frac{DELAY\ OUTPUT*VAR}{REF*VAR} = \frac{\frac{RV}{2}\sin\omega T_D \sin\theta}{\frac{RV}{2}\cos\theta} + \quad (9)$$

$$\frac{\frac{RV}{2}\cos\omega T_D \cos\theta}{\frac{RV}{2}\cos\theta}$$

$$\frac{DELAY\ OUTPUT*VAR}{REF*VAR} = \frac{\sin\omega T_D \sin\theta}{\cos\theta} + \cos\omega T_D \quad (10)$$

If $\sin(\omega T_D)$ and $\cos(\omega T_D)$ can be determined, these terms may be used as correction factors to determine the exact bearing.

Continuing further, the reference signal may be multiplied times the delay line output signal and manipulated in accordance with trigonometric formula to obtain Equations (11) and (12).

$$REF*DELAY\ OUTPUT = R^2 \sin(\omega t) \sin(\omega(t - T_D)) \quad (11)$$

$$REF*DELAY\ OUTPUT = (R^2/2)(\cos(\omega T_D) - \cos(2\omega t - \omega T_D)) \quad (12)$$

After filtering out the variable or alternating righthand portion of Equation (12), Equation (13) is obtained.

$$REF*DELAY\ OUTPUT = (R^2/2)\cos(\omega T_D) \quad (13)$$

The reference signal may then be multiplied by itself and manipulated to obtain Equations (14) and (15).

$$REF*REF = R^2 \sin(\omega t) \sin(\omega t) \quad (14)$$

$$REF*REF = (R^2/2)((\cos 0) - \cos(2\omega t)) \quad (15)$$

After filtering, the variable righthand portion out of Equation (15), Equation (16) is obtained since the cosine of zero degrees has a value of 1.

$$REF*REF = (R^2/2) \quad (16)$$

By dividing Equation (12) by Equation (16), Equation (17) is obtained whereby the original inputs can be utilized to compute the $\cos(\omega T_D)$ correction factor.

$$\cos(\omega T_D) = \frac{\frac{R^2}{2}\cos(\omega T_D)}{\frac{R^2}{2}} = \frac{REF*DELAY\ OUTPUT}{REF*REF} \quad (17)$$

The $\sin(\omega T_D)$ correction factor may be computed by using the trigonometric identity of Equation (18).

$$\sin(\omega T_D) = \sqrt{1 - \cos^2(\omega T_D)} \quad (18)$$

From the above, it can be ascertained that by computing and filtering the four times in Equations (1), (4), (11) and (14), we have all of the information needed to compute the bearing exactly regardless of the exact frequency of the substantially constant 30 hertz frequency signal.

In practice, the error contributed by the $\sin \omega T_D$ term is negligible, provided the 30 hertz tolerance is limited to $+/-$ 5 percent. (Typically, the ground transmitting stations have accuracies of approximately $+/-$ 1 percent and, in fact, this is the published value).

A 5 percent error of the 90 degree phase shift appropriate to these equations would be a phase shift of 85.5 degrees. The sin of this angle is 0.9969. It can thus be ascertained that this term is very close to a value of 1 if a 1 percent error is assumed, the angle would be 89.1 degrees and the sin of this angle is 0.99988. Again, this term is even closer to a value of 1. It may thus be ascertained that the major error contribution comes from $\cos(\omega T_D)$ and that for most calculations $\sin \omega T_D$ can be ignored.

Using the equations derived above, the following Equations (19) through (21) will provide the angle $\theta$ by taking the arctangent of the first value in Equation (19) less the second value or, in other words, Equation (10) wherein Equation (17) is substituted for $\cos(\omega T_D)$ and the term $\sin \omega T_D$ is assumed to be 1.

$$\frac{\text{SIN }\theta}{\text{COS }\theta} = \frac{\text{DELAY OUTPUT*VAR}}{\text{REF*VAR}} - \cos(\omega T_D) \quad (19)$$

$$\text{TAN }\theta = \frac{\text{DELAY OUTPUT*VAR}}{\text{REF*VAR}} - \quad (20)$$

$$\frac{\text{REF*DELAY OUTPUT}}{\text{REF*REF}}$$

$$\theta \text{ measured} = \text{ARCTAN}\left(\frac{\text{DELAY OUTPUT*VAR}}{\text{REF*VAR}} - \frac{\text{DELAY OUTPUT*REF}}{\text{REF*REF}}\right) \quad (21)$$

This invention, as defined by Equation (21), may be practiced using analog or discrete digital techniques as well as by programming a microprocessor.

Previous VOR receivers in the art using in phase and quadrature phase signal processing have used analog systems entirely. These prior art systems have employed analog phase shift networks to generate the quadrature signal. Later systems employing digital techniques have used Hilbert Transform filters to generate a quadrature signal. Both of these last mentioned approaches suffer inaccuracies from either error in the phase shift or non-unity gain in the phase shift network. As is known to those skilled in the art, the reference and quadrature signals must have identical amplitude values to eliminate errors. One solution to the problem is an approach I presented in my co-pending application Ser. No. 441,454, filed Nov. 15, 1982, and assigned to the same assignee as the present invention. This last mentioned approach of mine uses a variable length delay line for VOR bearing measurement. The reference application illustrates a system which allows a variable sample frequency (dependent on and tied to the frequency of the signal received) and a fixed length delay line and develops correction factors which are used to compensate for signal frequency errors.

The present invention allows a system which has the advantage of maintaining a fixed sample frequency or sampling time which fixed time may be important in environments where other signal processing must also take place.

This may be illustrated by referring to FIG. 1 wherein the reference signal is supplied on lead 10 to bandpass filter 12 where it is filtered to remove extraneous frequency signals and then multiplied by itself in multiplier 18 in accordance with Equation (14). This signal is then filtered by filter 32 to remove the alternating component and provide as an output the signal shown in Equation (16). The signal on lead 14 is also delayed in delay line 16 and multiplied times the reference signal in block 20 to provide the signal output shown in Equation (12). When this is filtered by filter 40, the alternating component is removed and an output is obtained as shown in Equation (13). Divider 36 divides the signal on lead 42 by the signal on lead 34 in accordance with Equation (17) to provide the output signal $\cos(\omega T_D)$ or, in other words, the second term of Equation (10).

The variable frequency signal is passed through bandpass filter 26 and supplied to multipliers 30 and 22 to produce as output signals the products described in Equations (5) and (2), respectively. The alternating component of Equation (5) is removed by filter 44 to provide the signal on lead 46 described in Equation (6). The alternating component of Equation (2) is removed by filter 50 to provide at the output thereof the signal described in Equation (3). As may be ascertained, these signals represent the numerator and denominator of the portion of Equation (19) having the components DELAY OUTPUT*VAR/REF*VAR. This quotient then has subtracted from it the signal from divider 36. The result of this subtraction is supplied to the arctangent block 60 on lead 58. When the arctangent of the signal on lead 58 is generated, the angle $\theta$ is obtained as an output on lead 62. While this signal is subject to a very small error factor as described above if the frequency is not exactly 30 degrees, this error factor is very nominal.

Although multiplying circuits in the analog world are well known, the availability of dividing circuits is not as prevalent. One method that the dividing circuit of either component 36 or 48 can be obtained is by the manner illustrated in FIG. 2 If the log of the incoming signal is subtracted from the log of the other signal being received, the net result is the equivalent of a division. If the antilog of this resultant signal is then obtained, the analog output is equivalent to a division of the two incoming analog signals. Thus, FIG. 2 is an elaboration on the contents of one embodiment of either blocks 36 or 48.

While the accuracy of the device of FIG. 1 is believed adequate for most implementations of the present invention, FIG. 1 can be modified by the blocks 100 through 112 as shown in FIG. 3 to add the correction factor of Equation (18). Thus, the $\cos(\omega T_D)$ signal is squared and subtracted from a constant value received from constant block 104. The result of this subtraction is then processed in the square root block 106 and inverted in block 110 wherein it can be multiplied times the signal obtained from subtraction circuit 54 before being processed by the arctangent circuit 60. This multiplication will eliminate the very small source of error still remaining in the system illustrated in FIG. 1.

This invention can also be implemented by programming a microprocessor. In one embodiment of the invention utilizing a programmed microprocessor, a TIMER INTERRUPT ROUTINE was called every 833 microseconds. In this TIMER INTERRUPT ROUTINE, the reference and variable 30 hertz signals are sampled as received from an analog-to-digital converter and passed through separate digital bandpass filters. The reference output from one bandpass filter is passed through the delay line to generate an output which is time delayed by 8.33 milliseconds. The four products are computed, filtered, and made available to the main program which computes the final bearing. A pseudocode presentation of the TIMER INTERRUPT is presented in the following TIMER INTERRUPT SEQUENCE.

---

TIMER INTERRUPT SEQUENCE

---

TIMER INTERRUPT:
INPUT REFERENCE SIGNAL

```
                TIMER INTERRUPT SEQUENCE
INPUT VARIABLE SIGNAL
CALL BPF (REFERENCE,.FILT REFERENCE,.FILT TEMP REFERENCE)
CALL BPF (VARIABLE,.FILT VARIABLE,.FILT TEMP VARIABLE)
CALL DELAY (FILT REFERENCE,.DELAY OUTPUT)
PROD1 = FILT REFERENCE * FILT REFERENCE
PROD2 = FILT REFERENCE * DELAY OUTPUT
PROD3 = FILT VARIABLE * DELAY OUTPUT
PROD4 = FILT VARIABLE * FILT REFERENCE
CALL LPF (PROD1,.FILT PROD1,.TEMP PROD1)
CALL LPF (PROD2,.FILT PROD2,.TEMP PROD2)
CALL LPF (PROD3,.FILT PROD3,.TEMP PROD3)
CALL LPF (PROD4,.FILT PROD4,.TEMP PROD4)
RETURN
END TIMER INTERRUPT
```

A BANDPASS FILTER SUBROUTINE as shown below takes the three signals supplied in the call routine, processes the data and returns the filtered output. The center frequency and filter Q (bandwidth) signals are programmable via the K1, K2 and K3 values incorporated in the subroutine.

```
              BPF (BANDPASS FILTER) SUBROUTINE
BPF: PROCEDURE (INPUT,.OUTPUT,.TEMP OUTPUT)
OUTPUT = OUTPUT + K1 * (INPUT − OUTPUT) − KZ * TEMP OUTPUT
TEMP OUTPUT = TEMP OUTPUT + K3 * OUTPUT
RETURN OUTPUT, TEMP OUTPUT
END BPF
```

When the BANDPASS FILTER SUBROUTINE is called for the REFERENCE signal, the INPUT signal in this routine would be the same as the REFERENCE signal in the call statement, the OUTPUT signal would be the same as FILT REFERENCE and the TEMP OUTPUT would be the same as FILT TEMP REFERENCE. Likewise, when this subroutine is called for the VARIABLE signal, the INPUT is identical to the VARIABLE signal, the OUTPUT is identical to the FILT VARIABLE signal and the TEMP OUTPUT signal is the same as FILT TEMP VARIABLE.

A DELAY SUBROUTINE listed below acts in response to a call delay instruction to provide a total delay of 8.33 milliseconds. Since the routine is called every 833 microseconds, and since the delay is exactly ten steps, the total delay of the signal through the delay line is 8.33 milliseconds. This causes the output signal to be effectively delayed by 90 degrees with respect to the non-delayed reference signal at exactly 30 hertz. (These two signals, INPUT AND DELAY (10), would correspond to the analog version of FIG. 1 as the signals appearing on leads 38 and 14, respectively.)

```
                  DELAY SUBROUTINE
DELAY:  PROCEDURE (INPUT,.DELAY (10))
DO I =   1 to 9
         DELAY (11 − I) = DELAY (10 − I)
         END DO
DELAY (I) = INPUT
RETURN DELAY (10)
END DELAY
```

In the above procedure, the contents of each register beginning with the last register are updated by the contents of the next smaller number register and at the end of the DO statement loop the signal input is placed in the first register. Also, the contents of the last register are then output back to the main TIMER INTERRUPT ROUTINE. PROD1 through PROD4 are obtained by digitally multiplying the signals retrieved or computed to date.

The routine then calls a low-pass filter procedure which implements the equivalent of an analog two pole low-pass filter. The filtering procedure removes the 60 hertz components from the products defined as PROD1 through PROD4 in the routine and leaves the DC components. Time constants are programmable via the constant K and the time constant used in one embodiment of the invention was 0.1 seconds.

```
            LPF (LOW-PASS FILTER) PROCEDURE
LPF: PROCEDURE (INPUT,.OUTPUT,.OUTPUT1)
OUTPUT1 = OUTPUT1 + K * (INPUT − OUTPUT1)
OUTPUT = OUTPUT + K * (OUTPUT1 − OUTPUT)
RETURN OUTPUT, OUTPUT2
END LPF
```

In the above procedure, which is called on four consecutive occasions, the appropriate product is provided as the "INPUT" signal, the appropriate filter product and temporary product are input as OUTPUT and OUTPUT1. After the first call, each of these second and third values in the call procedure have been stored from the previous TIMER INTERRUPT ROUTINE and are used to update the filter value.

The primary bearing computations use the parameters computed by the TIMER INTERRUPT. This compute bearing routine runs at 20 times per second in one embodiment of the invention but could be put in the TIMER INTERRUPT and computed faster if the machine providing the computations is fast enough to provide the computations while still completing the TIMER INTERRUPT ROUTINE once every 833 microseconds. The routine shown below rearranges terms to arrive at an expression with a single numerator and denominator to be used by an arctangent routine to compute the four quadrant arctangent.

```
COMPUTE BEARING PROCEDURE
─────────────────────────────────────────────
COMPUTE BEARING: PROCEDURE (.VOR BEARING)
NUMERATOR = FILT PROD1 * FILT PROD3 — FILT PROD4 * FILT PROD2
DENOMINATOR + FILT PROD1 * FILT PROD4
VOR BEARING = ARCTANGENT (NUMERATOR, DENOMINATOR)
RETURN VOR BEARING
END COMPUTE BEARING
```

As will be noted, the pseudocode outlined above did not include the computation of the sin $(\omega T_D)$ value since it was not deemed significant. However, such computations could be performed using the same reasoning as outlined in the analog approach of FIG. 3.

As can be seen from the above description of two embodiments of the invention, the inventive concept lies in the realization that a correction factor signal can be computed using various combinations of the reference and variable signal input from the VOR station to compensate for errors introduced into a fixed delay line from normally occurring frequency deviations of the signal transmitted by the VOR transmitting station. These correction signals can then be subtracted from the normally computed signal to obtain an output signal directly indicative of the actual bearing of the receiver with respect to the VOR transmitting station.

While I have shown and described two implementations of my inventive concept, I wish to be limited not by the implementations shown but only by the scope of the appended claims wherein I claim:

1. The method of determining bearing angle using reference and variable signals received from a VOR ground station comprising the steps of:
   phase shifting the reference signal by approximately 90 degrees;
   generating a first signal by multiplying the phase shifted signal by the reference signal and dividing the DC component of the result by the DC component of the reference signal squared;
   generating a second signal by multiplying the phase shifted signal by the variable signal and dividing the DC component of the product by the DC component of the product of the reference and the variable signals; and
   generating the bearing indicative angle by calculating the arctangent of the second signal less the first signal.

2. Apparatus for determining bearing angle using reference and variable signals received from a VOR ground station comprising, in combination:
   first means for phase shifting the reference signal to produce a first signal;
   second means for generating a second signal by multiplying the first signal by the reference signal and dividing the DC component of the result by the DC component of the reference signal squared;
   third means for generating a third signal by multiplying the first signal by the variable signal and dividing the DC component of the product by the DC component of the product of the reference and the variable signals; and
   means for generating the bearing indicative angle by calculating the arctangent of the third signal less the second signal.

3. Apparatus for providing an output signal indicative of bearing in response to reference and variable signals received from a VOR station comprising, in combination:
   first means for supplying a reference first signal;
   second means for supplying a variable second signal;
   third means for phase shifting said first signal to provide a third signal;
   fourth means, connected to said first means, for generating a fourth signal indicative of the DC component of the square of said first signal;
   fifth means, connected to said first and third means, for generating a fifth signal indicative of the DC component of the product of said first and third signals;
   sixth means, connected to said second and third means, for generating a sixth signal indicative of the DC component of the product of said second and third signals;
   seventh means, connected to said first and second means, for generating a seventh signal indicative of the DC component of the product of said first and second signals;
   eighth means, connected to said fourth, fifth, sixth and seventh means, for generating an eighth signal indicative of the quotient of said fifth signal divided by said fourth signal subtracted from the quotient of said sixth signal divided by said seventh signal; and
   ninth means, connected to said eighth means, for generating an arctangent of said eighth signal as an apparatus output signal.

4. The method of determining bearing angle using reference and variable signals received from a VOR ground station comprising the steps of:
   providing an phase shift of the reference signal which is substantially equivalent to 90 degrees by time delaying same for a fixed period of time to produce a reference first signal;
   generating a second signal equivalent to the product of said first signal by the reference signal
   generating a third signal equivalent to the square of the reference signal
   generating a fourth signal equivalent to the quotient of the DC component of said second signal divided by the DC component of said third signal;
   generating a fifth signal equivalent to the product of said first signal and the variable signal;
   generating a sixth signal equivalent to the product of the reference signal and the variable signal; and
   generating a seventh signal equivalent to the quotient of the DC component of said fifth signal divided by the DC component of said sixth signal;
   generating an eighth signal equivalent to the difference obtained by subtracting the DC component of said fourth signal from the DC component of said seventh signal; and
   generating the bearing angle indicative signal equivalent to the arctangent of said eighth signal.

5. Apparatus for providing an output signal indicative of bearing in response to reference and variable signals received from a VOR station comprising, in combination:

first means for supplying a reference first signal;

second means for supplying a variable second signal;

third means for providing an phase shift of said first signal which is substantially equivalent to 90 degrees by time delaying same for a fixed period of time to produce a reference third signal;

fourth means, connected to said first means, for generating a fourth signal indicative of the DC component of the square of said first signal;

fifth means, connected to said first and third means, for generating a fifth signal indicative of the DC component of the product of said first and third signals;

sixth means, connected to said second and third means, for generating a sixth signal indicative of the DC component of the product of said second and third signals;

seventh means, connected to said first and second means, for generating a seventh signal indicative of the DC component of the product of said first and second signals;

eighth means, connected to said fourth, fifth, sixth and seventh means, for generating an eighth signal indicative of the quotient of said fifth signal divided by said fourth signal subtracted from the quotient of said sixth signal divided by said seventh signal; and ninth means, connected to said eighth means, for generating an arctangent of said bearing angle indicative eighth signal as an apparatus output signal.

* * * * *